United States Patent [19]
Thaler

[11] 3,837,348
[45] Sept. 24, 1974

[54] EXTERNALLY-CONTROLLED IMPLANTABLE CARDIAC-PACER CAPTURE MARGIN TESTING APPARATUS AND METHOD

[75] Inventor: Sherwood S. Thaler, Lexington, Mass.

[73] Assignee: American Optical Corporation, Southbridge, Mass.

[22] Filed: Jan. 10, 1972

[21] Appl. No.: 216,601

[52] U.S. Cl............................ 128/419 P, 128/2.05 R
[51] Int. Cl................................................. A61n 1/36
[58] Field of Search........ 128/2.05 R, 2.06 R, 419 P

[56] References Cited
UNITED STATES PATENTS

| 3,426,748 | 2/1969 | Bowers............................ 128/419 P |
| 3,528,428 | 9/1970 | Berkovits......................... 128/419 P |
| 3,618,615 | 11/1971 | Greatbatch...................... 128/419 P |
| 3,638,656 | 2/1972 | Grand Joan et al............. 128/419 P |
| 3,669,120 | 6/1972 | Nielsen et al.................... 128/419 P |
| 3,717,152 | 2/1973 | Van Den Berg................. 128/419 P |

FOREIGN PATENTS OR APPLICATIONS

985,797   3/1965   Great Britain................... 128/419 P

*Primary Examiner*—William E. Kamm
*Attorney, Agent, or Firm*—Joel Wall; William C. Nealon; Howard R. Berkenstock, Jr.

[57] ABSTRACT

Externally controlled implantable cardiac pacer and heart testing apparatus. Apparatus is disclosed for use with an implantable heart-stimulating device to initiate a test mode for investigating several electro-medical areas including the implanted power source. In one test mode, induced continuous heart stimulation is provided at a stimulation rate dependent upon the level of the power source thus providing an indication of remaining life of the power source. This test mode also provides test-stimuli each of which has its energy reduced by a pre-determined amount to indicate degree of capture-margin available. One of the external controls disclosed causes another test mode in which all heart stimulation ceases and provides a physician with an opportunity to check the patient's heart and heart rate under non-stimulative conditions.

2 Claims, 5 Drawing Figures

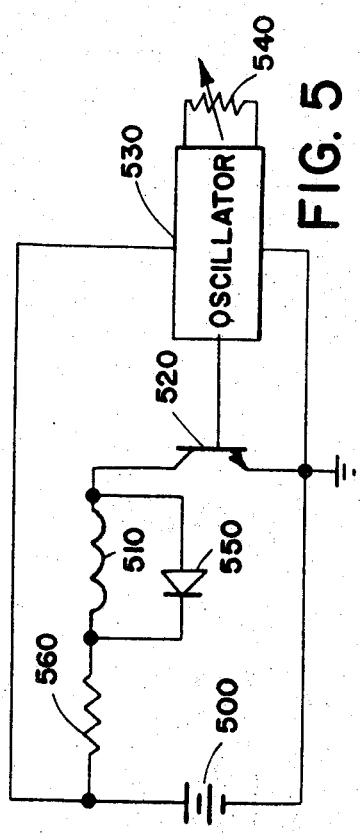
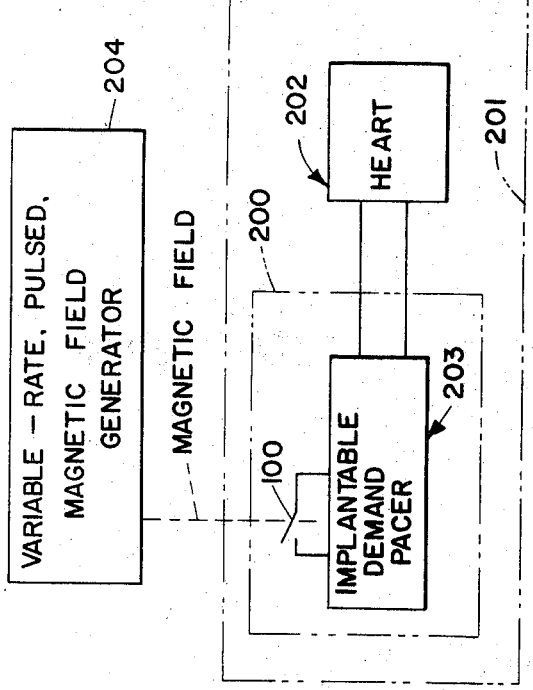
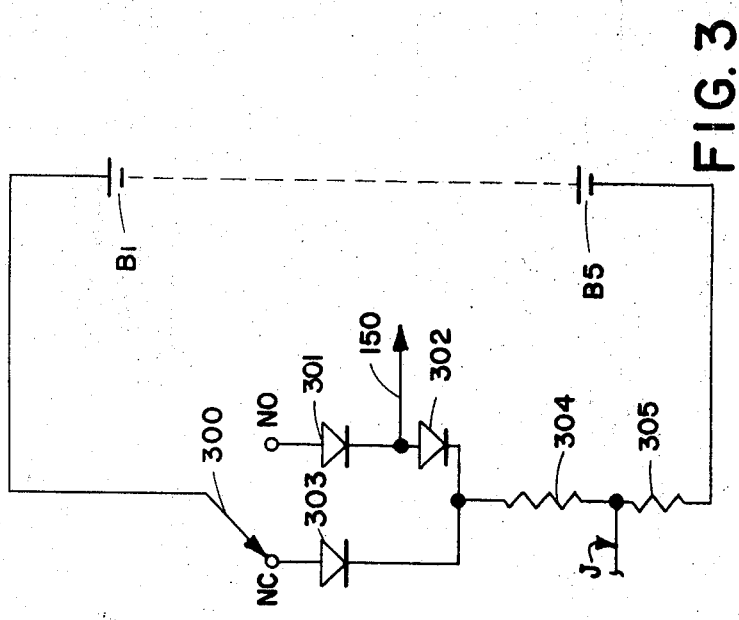

EXTERNALLY-CONTROLLED IMPLANTABLE CARDIAC-PACER CAPTURE MARGIN TESTING APPARATUS AND METHOD

BACKGROUND OF THE INVENTION

1. Field of the Invention

This invention relates in general to implantable heart stimulating devices. More particularly, the invention relates to external control over such devices for providing test modes wich allow at least determination of the extent of use of the implanted power source and the capture-margin available, and investigation of non-stimulative heart operation.

2. Description of Prior Art

Implantable heart stimulating devices, of both a continuous and demand type, have been disclosed in prior art. External means for controlling operation of the implanted device has also been disclosed, i.e.: an externally magnetically operated implanted reed switch. An example of these reed switches can be seen in U.S. Pat. No. 3,311,111 to Bowers. However, the operation of these prior art reed switches do not provide the test mode or modes of the operation invention.

In another patent to Bowers, U.S. Pat. No. 3,563,247, there is disclosed an external control for varying rate of stimulation pulses. This '247 patent discloses a variation in pulse rate for the purpose of stimulating the patient at a therapeutic rate different from the initial pacer rate provided. Although the present invention also provides a variation in pulse rate, it is not for providing the patient with a new therapeutic stimulation rate different from the initial pacer rate. The present invention utilizes rate information during a temporary test mode of operation to provide at least an indication of remaining life of the implanted power source. This is not disclosed in the prior art.

Certain pacers on the market today are designed to maintain a stable pulse rate regardless of battery condition. There is no apparent rate change or other indication of forthcoming failure of the device until several cells of the total number of cells have failed. Then catastrophic failure may occur. Although apparent life of the pacer is lengthened, actual life of the pacer is not changed at all.

This approach to implantable pacers is desirable from a marketing point of view, but undesirable from a life-support point of view. The patient's life depends on continued proper functioning of implanted circuitry. The pacer may lose capture (the ability of the pacer to stimulate the heart) because of the reduced pulse energy. With this type of design, there is no readily available way of checking the batteries at various times throughout the pacer's life.

It is thus desirable to know how much battery life remains at varying points in time after implantation. An undesirable way to determine battery life is to utilize a surgical procedure and remove the implanted pacer to test the batteries. This is, of course, a poor approach. It is desirable to make the determination of remaining power source life by observing some characteristic of the pacer while it remains implanted. This characteristic of the pacer should be selected to provide an indication to the observer of the state of the power source. A solution to this battery depletion-sensing problem is provided by utilizing an externally manually controlled test rate mode of operation. In the normal demand mode of operation, the pacer provides a pulse rate substantially independent of power source level.

The pacer may lose capture for yet another reason. The energy requirements imposed by the heart on the pacer, to cause the heart to beat, may increase with time. Thus, if the batteries have not been substantially depleted, the extra energy required by the heart may in itself prevent the pacer from causing capture. The prior art does not disclose readily available means for making this capture-margin determination; a reduced pulse energy mode is provided herein to allow this determination to be made.

In the prior art, there is no convenient non-invasive technique to control an implantable demand pacer's stimulator to provide no stimulation. This heretofore unavailable test mode "down-time" would allow a physician to investigate a patient's heart under non-stimulative conditions, and is provided herein. For almost all pacer heart patients, this medical check is desirable from time to time.

SUMMARY OF THE INVENTION

The invention comprises externally controlled implanted test mode circuitry which causes predetermined percentage change in stimulation impulse energy available to cause capture. In a particular embodiment, a voltage divider is used to reduce stimulation impulse amplitude. Pulse width variation and other pulse energy varying approaches can be used.

An advantage of the present invention is to allow the physician to check the capture margin (a margin of safety of the pacemaker) in an ideal medical environment. Potential capture problems may thus be avoided.

It is thus an object of the invention to provide an improved heart stimulating device.

It is an additional object of the invention to provide externally controlled implantable test mode circuitry and method for determining the margin of energy available over the amount of energy required by the heart in order to be stimulated to beat.

Other objects and advantages of the present invention will become apparent to one having reasonable skill in the art after referring to the detailed description of the appended drawings wherein:

BRIEF DESCRIPTION OF THE DRAWINGS

FIG. 3 is an alternative embodiment of power source testing apparatus;

FIG. 4 is a functional representation of pacer stimulation inhibition apparatus; and FIG. 5 is an illustrative embodiment of part of the apparatus of FIG. 4.

DESCRIPTION OF THE PREFERRED EMBODIMENTS

Figure 1:
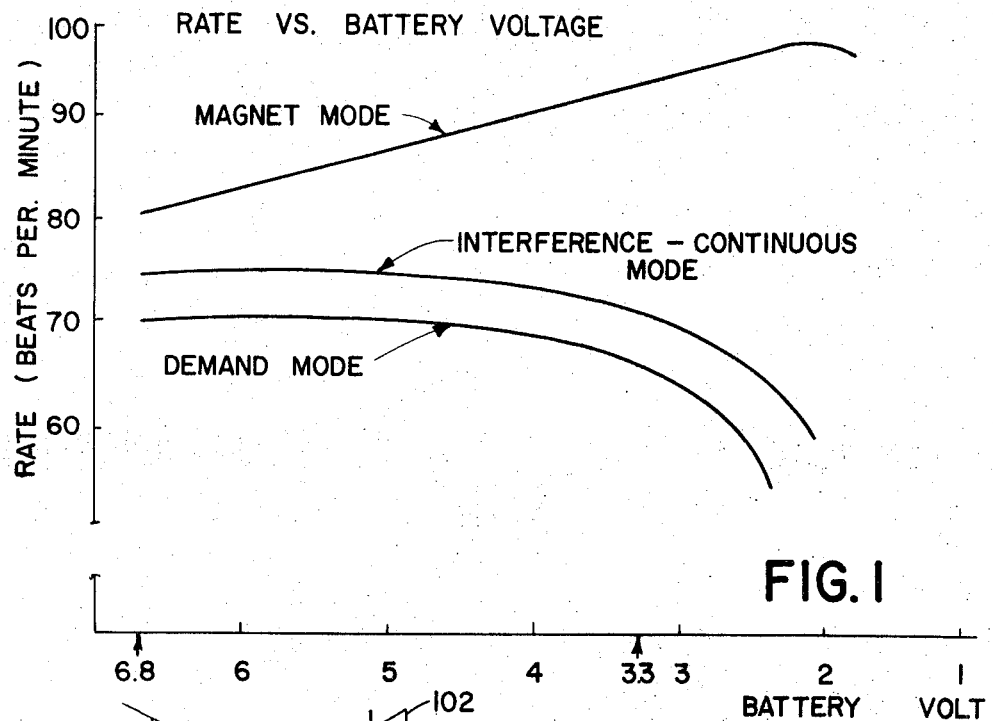
FIG. 1 is a graphical representation of rate characteristics of the pacer as a function of diminishing battery voltage.
Figure 2:
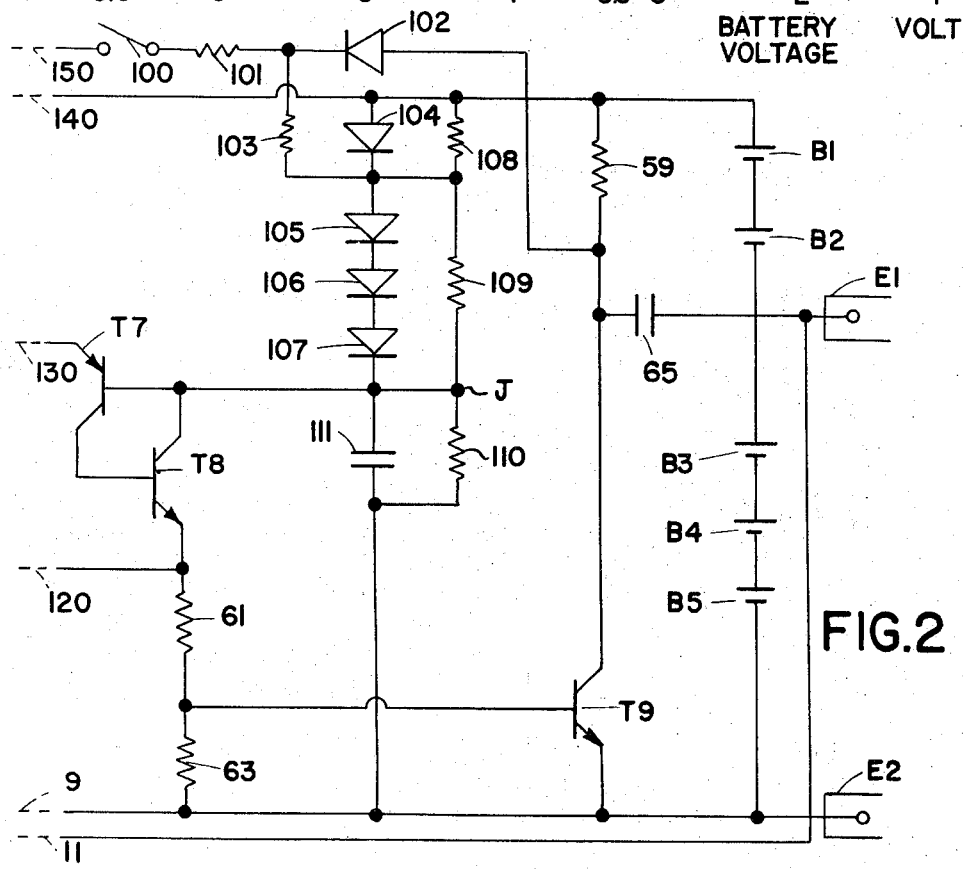
FIG. 2 is a schematic representation of an illustrative embodiment of the present invention.

FIG. 2 is a schematic of an illustrative embodiment of the present invention. The schematic of FIG. 2 is to be viewed in conjunction with FIG. 1 of U.S. Pat. No. 3,528,428, the combination of which provides an operative embodiment. The subject matter of this patent is incorporated herein by reference. The following components of FIG. 2 of the instant application are identical to components of FIG. 1 of the '428 patent: transistors T7, T8 and T9; resistors 61, 63 and 59; capacitor 65; electrodes E1 and E2; and conductors 9 and 11. Interconnection of these components is described in the '428 patent. Other components in FIG. 2 of the instant application may be equivalent or equal to components shown in FIG. 1 of the '428 patent, but are given different reference numerals.

With reference to FIG. 2, showing component interconnection, the anode of diode 102 is connected to the junction of resistor 59, and capacitor 65. The cathode of diode 102 is connected to the junction of resistors 101 and 103. The other end of resistor 101 is connected to one end of an externally operated implantable magnetic reed switch 100. The other end of reed switch 100, the fixed end, goes to conductor 150.

The other end of resistor 103 is connected to a junction comprised of a cathode of diode 104, the anode of diode 105, and resistors 108 and 109. Diodes 104 and resistor 108 are in parallel connection. Diodes 105, 106 and 107 are in a series string and are in a parallel connection with resistor 109. The junction of resistor 109 and the cathode of diode 107 are connected to one end of parallel combination of capacitor 111 and resistor 110, the other end of which parallel combination is connected to conductor 9. The junction of resistors 109 and 110 (junction J) is connected to the base of transistor T7. The potential at this junction is the threshold level for the timing circuitry, and will be discussed below in detail.

Now, interrelating the circuitry of the instant application with the U.S. 3,528,428 Pat. No., conductor 150 is connected to the emitter of transistor T1 in FIG. 1 of the '428 patent. Conductor 140 is connected to the junction of resistors 33 and 35 in the '428 patent. Conductor 130 is connected to junction of potentiometers 35 and 37 in the '428 patent. Conductor 120 is connected to the junction of capacitor 57 and the emitter of T6 in the '428 patent. In this illustrative embodiment of the present invention, switch S of FIG. 1 of the '428 patent is omitted (i.e.: consider switch S to be held open at all times).

In operation, first consider the situation with switch 100 open as is shown. Current from the series string of batteries flows through resistor 59 and charges up capacitor 65 which holds the voltage as long as transistor T9 is not turned on. Current from the series string of batteries also flows through the parallel combination of diode 104 and resistor 108; the individual currents of the parallel branch combine to flow almost exclusively through resistor 109.

Diodes 105, 106 and 107 although in parallel with resistor 109, conduct negligible current in this "static" situation. Resistor values of resistors 108, 109 and 110, which form a voltage divider, are chosen to keep voltage across diodes 105, 106 and 107 below their combined forward voltage drop. This voltage is sufficiently low to prevent the diodes from conducting significantly in a forward direction. Diodes 105, 106 and 107 conduct significant current only during initial turn on of the circuitry when the batteries are initially connected. The diodes are used to counteract adverse transients during turn on. However, after a steady state situation is established, these diodes are functionally out of the circuit. They can be ignored without sacrificing any understanding of the operation of the instant invention.

With switch 100 open, as shown, normal demand mode of operation is permitted. If the heart demands a stimulating impulse, transistors T7 and T8 cause T9 to conduct, causing capacitor 65 to discharge through electrodes E1, E2, and the heart (not shown). In order to cause this stimulation, the potential of the emitter of T7 must exceed the potential on its base. This is described in the U.S. Pat. No. 3,528,428 patent in detail.

Capacitor 111 is a component now found in the '428 patent. It provides a function not heretofor described. When T8 conducts, some of the current for the collector of T8 comes from the charged up capacitor 111. After T8 stops conducting, capacitor 111 recharges to its former state through resistors 108 and 109. Capacitor 111 is chosen so that it does not recharge to its previous static voltage value in a time equal to or less than the time between pulses of an ordinary heart rate. Thus, when a second stimulation pulse is demanded after the first stimulation pulse, capacitor 111 has not charged up to its previous static state. Thus, voltage at junction J is slightly lower than its previously was. Threshold J is overcome by voltage at the emitter of transistor T7 earlier than it was for the first stimulation pulse. Voltage on capacitor 111 charges and discharges in this manner and thus "ripples" while successive stimulation pulses are being generated. Successive stimulation pulses are separated from each other by respective time intervals that are each less than that time interval between the last natural heartbeat and the first stimulation pulse. This is known in the art as rate hysteresis and is not the subject matter of the present invention but is presented for purposes of completeness.

Bearing in mind that switch 100 is open, consider the function of diode 104. Diode 104 is a compensating diode which compensates for the non-linear base-emitter voltage drop of transistor T7. When the batteries are fully charged and operating, component values for resistors 108, 109 and 110 are selected so that current drawn from these batteries is shared by resistor 108 and diode 104. The diode current could be approximately 0.5 microamps; it is sufficient current through diode 104 to provide compensation for the base-emitter junction of transistor T7 when the batteries start to diminish in voltage. (The base-emitter junction is essentially a diode also).

For example, consider one of the batteries B1–B5 to fail. The current through diode 104 is diminished somewhat in accordance with constraints imposed by voltage divider action of resistor 108 in combination with resistors 109 and 110. (Recall that diodes 105, 106 and 107 functionally out of the circuit.) The decrease in supply voltage is felt by timing capacitor 57 (shown in U.S. Pat. No. 3,528,428) which charges towards a lower voltage, and is also felt at junction J. (In order to avoid unnecessary repetition, certain components having the following reference designations are shown in U.S. Pat. No. 3,528,428 and are not shown in FIG. 2 of the present application: transistors T1, T6; resistors 19, 59; capacitor 57.) It is the compensating effect of diode 104 which allows junction J to decrease in voltage in a manner (with respect to decrease of charging rate of capacitor 57) so as to hold the demand rate approximately constant. Thus, decreased overall supply voltage will not substantially change the stimulation rate of the pacer. This is depicted in FIG. 1. The demand mode rate is shown to be approximately flat from maximum battery voltage to approximately four volts. In a particular case this corresponds to the failure of two cells.

By contrast, if diode 104 did not exist (was open) junction J would decrease in proportion to the decrease of supply voltage in a linear fashion because of pure resistive voltage divider action. But, the base-emitter voltage drop of transistor T7 is a relatively fixed amount which is added to the linearly decreased voltage at threshold J to arrive at that voltage to which capacitor 57 must charge prior to generating a stimulating impulse to the heart. Thus, if diode 104 were open or were missing, the rate versus battery voltage characteristic of FIG. 1 would not be relatively flat.

By comparison consider a first magnet mode or a first test mode. Switch 100 is a magnetically operable reed switch and is closed in response to effects of an external magnet (not shown). Current flows through diode 104, resistor 103, resistor 101 and resistor 19 to ground. Current through diode 104 when switch 100 is closed is approximately ten times the amount of current through diode 104 when switch 100 is open. Other current differentials can be used besides the factor of approximately ten. The increased current through diode 104 causes its voltage drop to substantially increase. This, in turn, causes the potential at threshold J to be decreased from total battery by an equal amount. The decrease in potential at junction J accounts for part of the marked increase in heart stimulation rate from the demand mode curve to the magnet mode curve as depicted in FIG. 1. (The reason for the other part of the increase is described below.) The decrease threshold voltage at J enables capacitor 57 to charge to that decreased threshold level more rapidly providing the increased rate.

Now, consider a failure of one or more batteries with switch 100 remaining closed. The total battery voltage supplied is reduced by about 20–40 percent. Current flow through diode 104 does decrease but due to the nonlinearity of diode 104, its forward voltage drop remains approximately constant. Thus, voltage change at threshold J is a greater percentage decrease than total battery voltage percentage decrease. In other words, threshold J voltage decreases proportionately faster than the total battery voltage decreases. At the same time, the voltage towards which capacitor 57 is charging decreases linearly with total battery voltage. As capacitor 57 charges under these conditions T7 is turned on earlier. As shown in FIG. 1, the rate of stimulation increases with decreasing total battery voltage. One can measure stimulation rate in the magnet mode and (from curves similar to those in FIG. 1) determine to what extent the batteries have become depleted and/or have failed.

Clsoure of switch 100 also causes other functionings. For example, the pacer is caused to be a continuous stimulation test mode. This is accomplished by causing transistor T1 to cut off (and not detect any heartbeats) because of a voltage impressed at the emitter of T1 through resistor 59, diode 102, and resistor 101. Continuous stimulation is necessary when testing battery level; otherwise, if the patient's heart were functioning normally and no pacer-generated stimuli appear, then no measurements may be taken.

However, the aforementioned disabling of transistor T1 in the magnet mode prevents transistor T6 from conducting in response to a heartbeat (either natural or stimulated). The collector to emitter drop of transistor T6 is approximately 0.1 volts. The double base-emitter junction drops of transistors T7 and T8 is approximately 0.5 volts. Thus, in the mode where switch 100 is closed, capacitor 57 is caused to recharge from a higher voltage pedestal (0.5 volts vs. 0.1 volts). This pedestal effect in itself will permit capacitor 57 to charge to trigger voltage in a shorter time then when switch 100 is open. This accounts for the other part of the rate increase between the demand mode curve and the magnet mode curve of FIG. 1.

In addition to the above two functionings, closure of switch 100 causes a reduced stimulating pulse amplitude output. Switch 100 has the effect of creating a voltage divider between resistor 59, resistor 101 and resistor 19. The effect of this divider is to reduce the amount of voltage to which capacitor 65 charges. This provides a reduced output pulse height and output pulse energy. This test mode allows one to determine the ability of the pacer to provide "capture" for a particular heart at a reduced pulsed energy. Initially, when electrodes are implanted in the heart, 1 or 2 milliamps may normally be required to cause capture for that heart at that time. After a period of time, the electrodes may move slightly, and/or scar tissue may develop in the heart at the point of stimulation. This may result in a larger amount of current being required for capture. For example, if one or two milliamps were required for capture and 15 milliamps was supplied initially, an initial margin of safety of about 7:1 is achieved. But if 12 milliamps is later required for capture, with 15 milliamps still being supplied, the margin of safety is substantially reduced.

The pulse height reduction feature of the present invention allows a doctor to check the margin of safety of the pacer in his office. This is a good environment in which to make such a check. The reduced pulse height of about 30 percent (in a particular design) reduces the stimulation energy to the heart. If this reduced stimulation pulse fails to cause the heart to beat, (to cause capture) the doctor knows that the margin of safety is very slim and appropriate medical action can be immediately taken. Of course, pulse energy can be reduced by decreasing the pulse width and by other ways. Reduction of pulse energy is a criteria, and reduction of pulse amplitude is a way to accomplish this. Charge is another criteria.

Therefore, closure of switch 100 in this first magnet mode causes (1) reduced output pulse amplitude, (2) rate of stimulation pulses to be increased and to increase as a function of diminishing battery voltage, and (3) the pacer to stimulate continuously. These three functions occur simultaneously.

Considering FIG. 3, there is presented an alternative embodiment for performing functions (2) and (3). Reed switch 300 has normally closed position NC and normally open position NO. When an external magnet (not shown) is brought in proximity to the switch, contact is made with terminal NO. Note that the continuous stimulation criteria is achieved by applying voltage to conductor 150 when in this magnet mode.

The anode of diode 303 is connected to terminal NC, the cathode being connected to the junction of cathode of diode 302 and one end of resistor 304. The anode of diode 302 is connected to conductor 150 and the cathode of diode 301. The anode of diode 301 is connected to terminal NO. The other end of resistor 304 is connected to junction J and one end of resistor 305. The other end of resistor 305 is connected to the most negative battery terminal, the most positive battery terminal being connected to reed switch 300. This circuitry can replace resistors 108, 109, 110, 101, 103 and diodes 104, 102 shown in FIG. 2.

In operation, with switch 300 in the position shown, diode 303 compensates in a manner equivalent to diode 104. As total battery voltage decreases, the rate stays relatively flat. But, if switch 300 is made to contact terminal NO, then the voltage at junction J decreases by virtue of an increased diode drop, thereby increasing the stimulation rate. If total battery voltage diminishes in this magnet mode the decrease is felt more strongly at junction J than it is felt by timing capacitor 57. (As before, capacitor 57 appears in U.S. Pat. No. 3,528,428 and does not appear in FIG. 3 of the present application.) This difference is due to the relatively constant forward voltage drop maintained across both diodes 301 and 302 which tends to decrease the voltage at junction J by an amount almost equal to the battery voltage decrease. By comparison the voltage towards which capacitor 57 charges is reduced in a manner akin to that achieved by resistive voltage divider action. As before, the net effect is for the measurable stimulation rate to increase with decreasing total battery voltage.

It should be understood that other circuitry can be provided whereby the rate tends to decrease rather than increase with decreasing battery voltage. For example, this can be accomplished in general by interchanging the roles of diodes and resistors in FIG. 3 along with making other suitable modifications. Thus, when the total battery voltage decreases, junction J will not decrease by an almost equal voltage, but will tend to remain almost constant. This will provide a decreasing stimulation rate with decreasing battery voltage. A change in rate is required to determine battery depletion; the direction of change does not provide any additional information and is not all that critical.

Considering FIG. 4, pacer 203 is intended to contain all of that circuitry disclosed in FIG. 2 (except for switch 100) in conjunction with its operative connection to FIG. 1 of the '428 patent. As shown, switch 100 and pacer 203 are contained within a suitable encapsulation 200 that is compatable with the environment of human body. The pacer is shown in operative connection with heart 202, all of which is contained within patient's body 201.

External to body 201 is shown a variable-rate, pulsed, magnetic field generator. This is shown to be in magnetic field communication with implanted switch 100. In an illustrative embodiment, this generator comprises an electromagnet connected to an external electrical source through a switching device that can be manually controlled to switch at a variable rate. Typically, the switching device is a variable frequency oscillator and a transistor switch controlled by the oscillator. This is depicted in FIG. 5. Battery 500 is shown as the power source. Inductor 510 provides the magnetic field. Diode 550 provide a discharge path for inductor 510. Transistor 520 is a switch controlled by oscillator 530 which is powered by source 500 also. Potentiometer 540 allows the oscillator frequency to be manually controlled over a wide range. Certainly, other arrangements can be used.

In operation, when the oscillator frequency is set to provide between about 2 and 5 pulses per second, reed switch 100 makes and breaks at this rate. Transistor T1 is thus caused to vary from dynamic operation to cut off causing its collector voltage to approach battery potential at this rate. This pulsation is conducted through the remaining circuitry as if each pulse were a detected heartbeat. Each "virtual heartbeat" causes transistor T6 to conduct thereby discharging capacitor 57 long before it could achieve sufficient potential to cause a simulation pulse to be generated. Thus, a non-stimulative mode is provided during which a physician may conduct a medical examination of the heart unfettered by continuous or sporadic pacer stimulation.

Alternatively, the frequency of oscillator 530 can be increased to more than about 15 pulses per second and can simulate detected interference. In this situation, capacitor 49 does not charge or discharge sufficiently between each pulse to cause turn-on of transistor T6. Thus, stimulation to the heart is continuously provided via the interference-mode, without the necessity of using a high-powered R-F generator to cause the interference.

A doctor may purposely want to cause the pacer to go into an "interference-continuous" mode for several reasons. One reason is to cause the pacer to generate stimulating impulses for measurement purposes when the pacer is inhibited by normal heart action. The rate at which the pacer will supply stimuli in this mode is close but not equal to the preset demand rate. These two rates differ because capacitor 57 discharges more through transistor T6 (one saturated transistor) than it does through T7 and T8 (two saturated transistors). The former discharge provides a slower rate. Thus, even for a new patient, (refer to the "interference-continuous" mode curve of FIG. 1), with no prior medical history available, a doctor can determine the preset demand rate by causing an interference-mode, causing T7 and T8 to conduct, measuring the stimuli rate, and subtracting a known number of beats per minute from that measured rate. This provides the doctor with demand rate for that implanted pacer. The doctor can then determine how depleted the implanted batteries may be by measuring the rate in the first magnet mode. This presupposes knowledge of the magnet mode rate at implantation and this data would be available for the medical profession. A curve similar to FIG. 1, but including guantitative voltage and rate information, would be supplied as well as other related curves. This test method and apparatus provides a determination of implanted battery condition without requiring any substantial medical history of the patient even under the condition of normal inhibition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which will come within the meaning and range of equivalency of the claims are therefore intended to be embraced therein.

What is claimed is:

1. In an improved implantable electronic demand heart pacer for providing stimulation to the heart of a patient, said pacer including terminal means for connection to said heart, a power source for energizing circuitry of said pacer, means for detecting the beating action of said patient's heart, pulse generator means connected to said source for supplying heart stimulating impulses at a predetermined amplitude on said terminal means, said pulse generator means including capacitor means, means for charging said capacitor means from said source toward a first voltage level corresponding to said predetermined amplitude and means for discharging said capacitor means through said heart, and means responsive to said detecting means detecting a heartbeat within a predetermined interval from the most previous heartbeat for preventing operation of said discharging means and responsive to said detecting means not detecting a heartbeat within said interval for causing said discharging means to supply one of said impulses at the end of said interval, the improvement comprising:

means for determining capture-margin including means for disabling the operation of said detecting means, a controllable D.C. voltage divider including means for discretely reducing the voltage of said capacitor means from said first voltage level to a lower voltage level thereby providing reduced-amplitude stimulation impulses, said voltage divider comprising at least two resistors connected across said voltage source, and means connecting the division point of said voltage divider to said capacitor, means for determining if said heart is caused to beat by said reduced amplitude impulses, and non-invasive, non-automatic, control means controlling the operation of said controllable voltage divider.

2. A method for determining capture-margin of an implantable demand heart pacer that provides stimulation to the heart of a patient, said pacer including terminal means for connection to said heart, a power source for energizing circuitry of said pacer, means for detecting the beating action of said patient's heart, pulse generator means connected to said source for supplying heart stimulating impulses at a predetermined amplitude on said terminal means, said pulse generator means including capacitor means, means for charging said capacitor means from said source toward a first voltage level corresponding to said predetermined amplitude and means for discharging said capacitor means through said heart, and means responsive to said detecting means detecting a heartbeat within a predetermined interval from the most previous heartbeat for preventing operation of said discharging means and responsive to said detecting means not detecting a heartbeat within said interval for causing said discharging means to supply one of said impulses at the end of said interval, said method comprising the steps of:

a. disabling the operation of said detecting means;

b. providing said stimulation impulses to said heart at a fixed rate;

c. reducing the voltage on said capacitor means from said first voltage level to a lower voltage level by resistively dividing the power output of said power source and connecting the reduced power output to said capacitor means to provide reduced-amplitude stimulation impulses;

d. determining if said heart is caused to beat by said reduced-amplitude impulses; and, e. manually and non-invasively controlled said reduced-amplitude stimulation impulses.

* * * * *